(12) United States Patent
Pitsolis et al.

(10) Patent No.: US 8,215,568 B1
(45) Date of Patent: Jul. 10, 2012

(54) DEVICE FOR PROVIDING TRACTION FOR A TIRE AND METHOD OF USE

(76) Inventors: Stacey B. Pitsolis, Newmarket (CA); Diana L. Pitsolis, Richmond Hill (CA)

( * ) Notice: Subject to any disclaimer, the term of this patent is extended or adjusted under 35 U.S.C. 154(b) by 254 days.

(21) Appl. No.: 12/589,608

(22) Filed: Oct. 26, 2009

Related U.S. Application Data

(63) Continuation-in-part of application No. 29/327,677, filed on Nov. 11, 2008, now Pat. No. Des. 617,263.

(51) Int. Cl.
 *E01B 23/00* (2006.01)
(52) U.S. Cl. ......................................... 238/14
(58) Field of Classification Search ............ 238/14; 428/98–100, 114, 143, 189, 190; 180/313
See application file for complete search history.

(56) References Cited

U.S. PATENT DOCUMENTS

| | | | | |
|---|---|---|---|---|
| 3,708,117 | A * | 1/1973 | Coale | 238/14 |
| 3,918,638 | A * | 11/1975 | Nelson | 238/14 |
| 4,300,722 | A * | 11/1981 | Simmons | 238/14 |
| 5,204,159 | A * | 4/1993 | Tan | 428/143 |
| 5,538,183 | A * | 7/1996 | McGee | 238/14 |
| 6,394,362 | B1 * | 5/2002 | Kramr | 238/14 |
| 7,229,232 | B2 * | 6/2007 | Amelung, Sr. | 404/36 |
| 7,404,524 | B2 * | 7/2008 | Mathieu | 238/14 |
| D617,263 | S | 6/2010 | Pitsolis | |

\* cited by examiner

*Primary Examiner* — S. Joseph Morano
*Assistant Examiner* — R. J. McCarry, Jr.
(74) *Attorney, Agent, or Firm* — Ted Masters

(57) ABSTRACT

A device for providing traction for a tire of a vehicle includes a pad which is fabricated from non-woven fibers which include an abrasive material. When the pad is placed in abutting relationship with the tire and a slippery surface of snow and/or ice, the abrasive material enhancing friction between said pad and the tire. Because the pad has an open non-woven construction, the snow or ice penetrates the pad and tends to hold it in place. In an embodiment of the invention, one end of the pad is convex and the opposite end is concave.

10 Claims, 7 Drawing Sheets

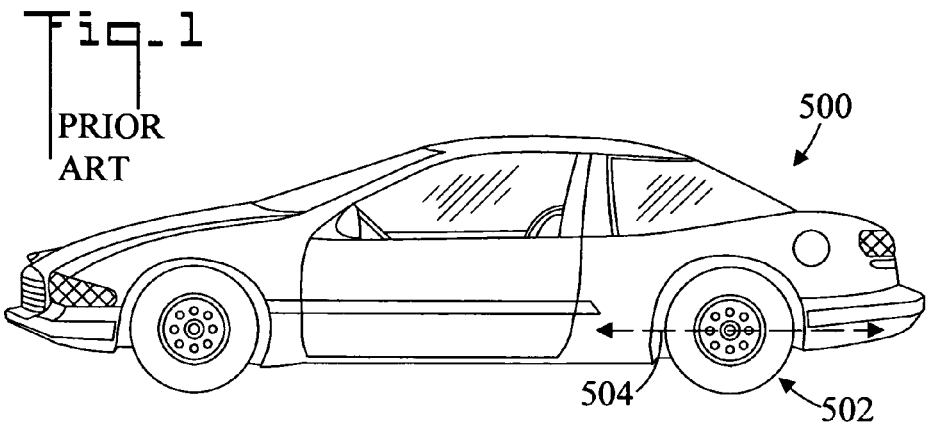
Fig_1 PRIOR ART
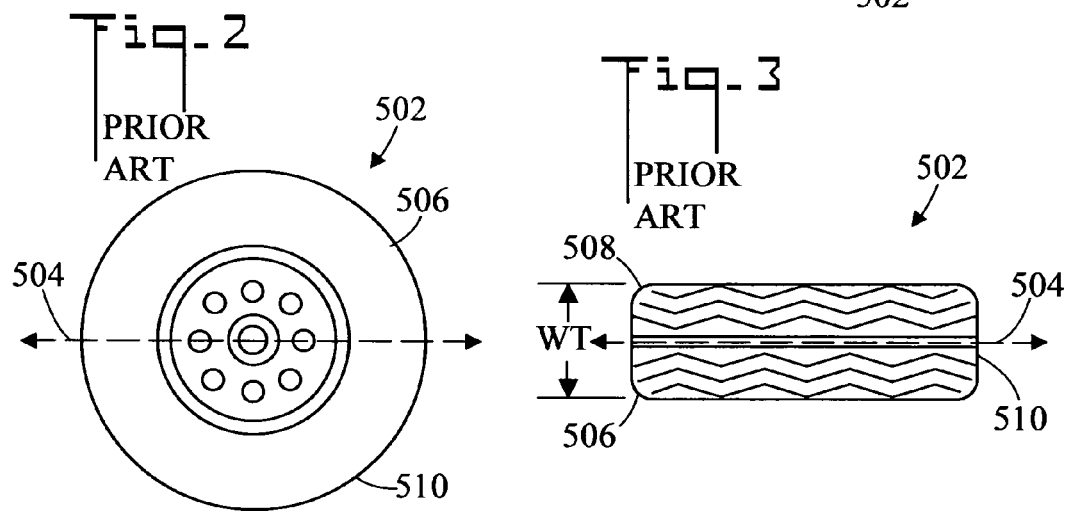
Fig_2 PRIOR ART
Fig_3 PRIOR ART
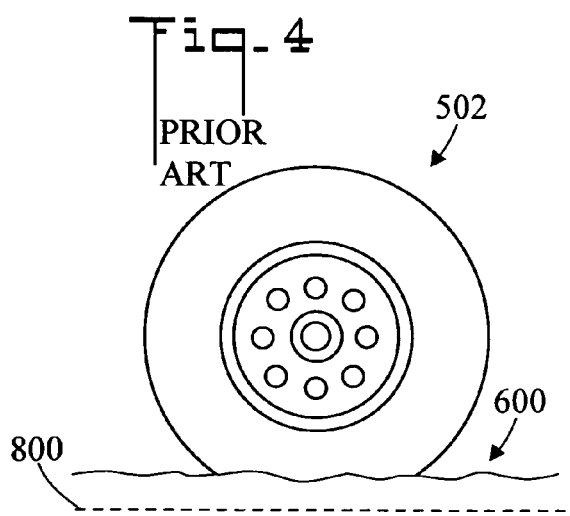
Fig_4 PRIOR ART
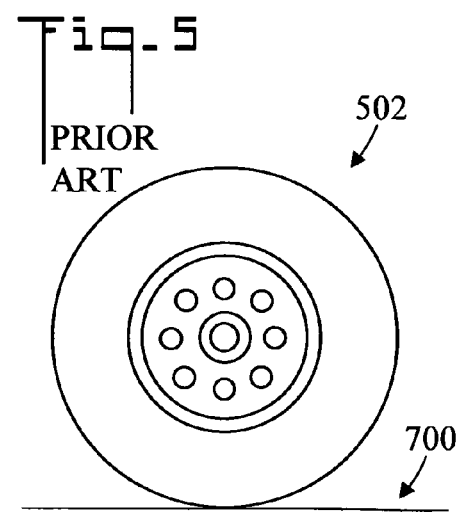
Fig_5 PRIOR ART

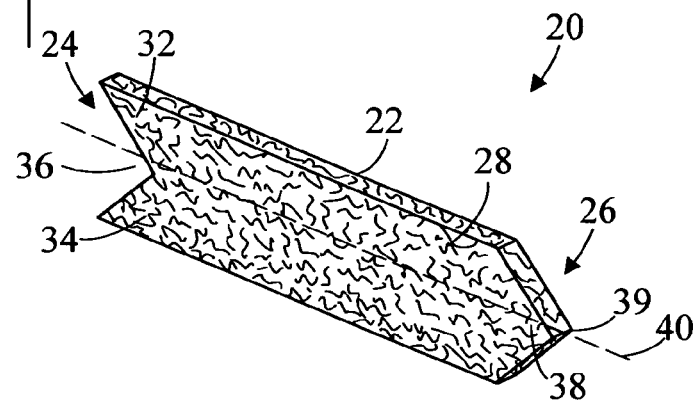
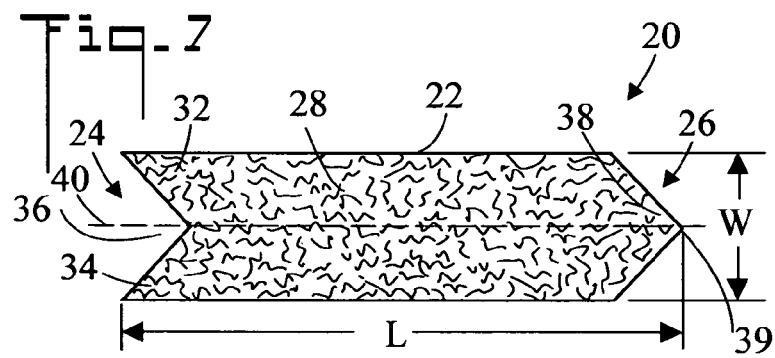
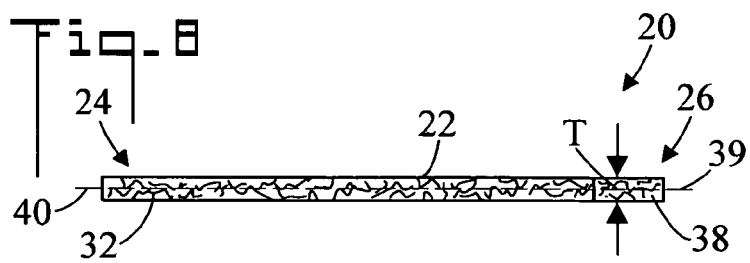
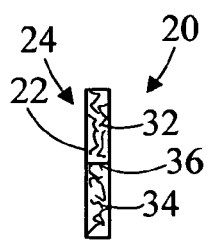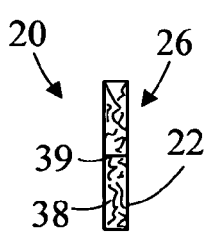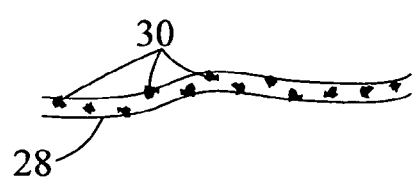

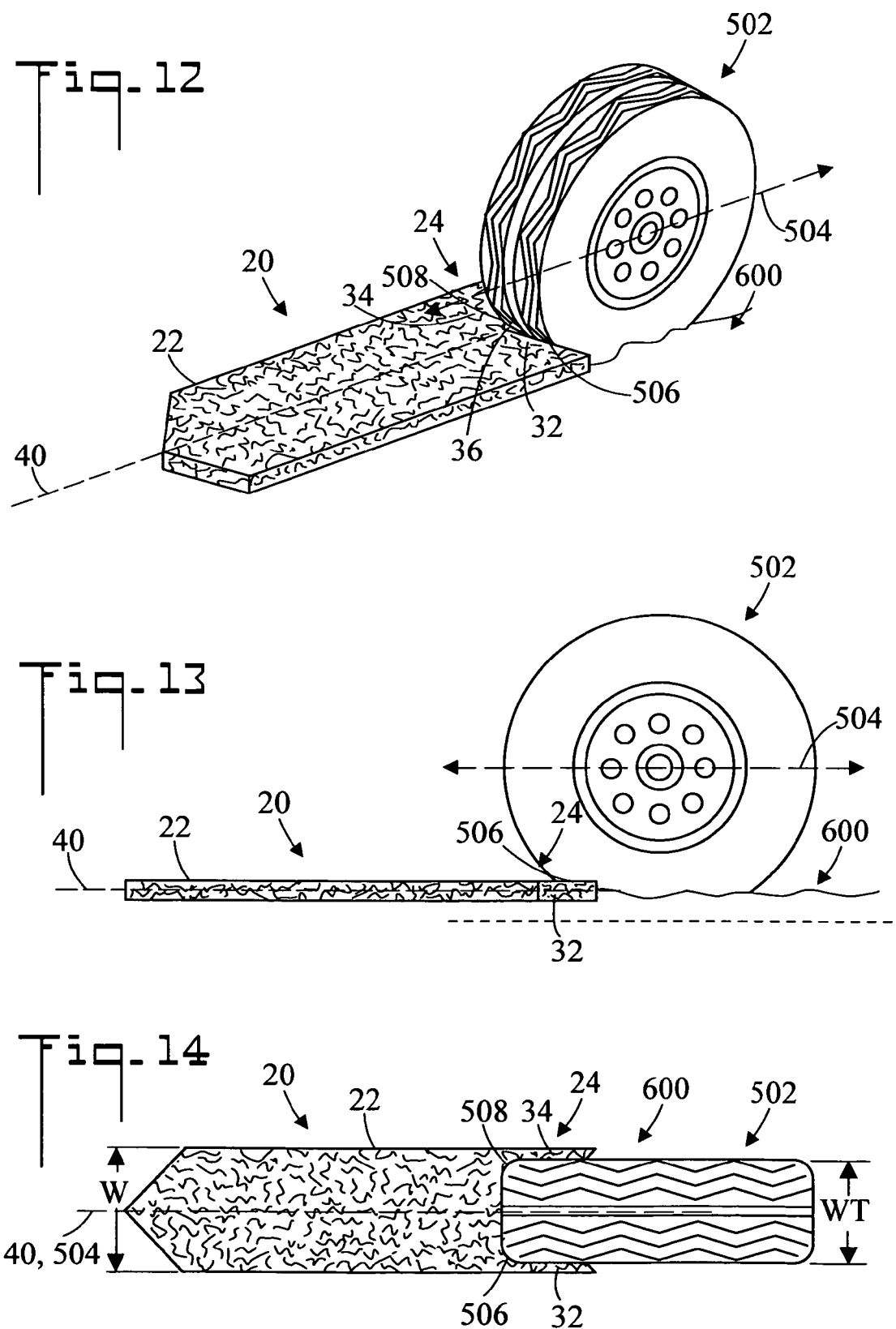

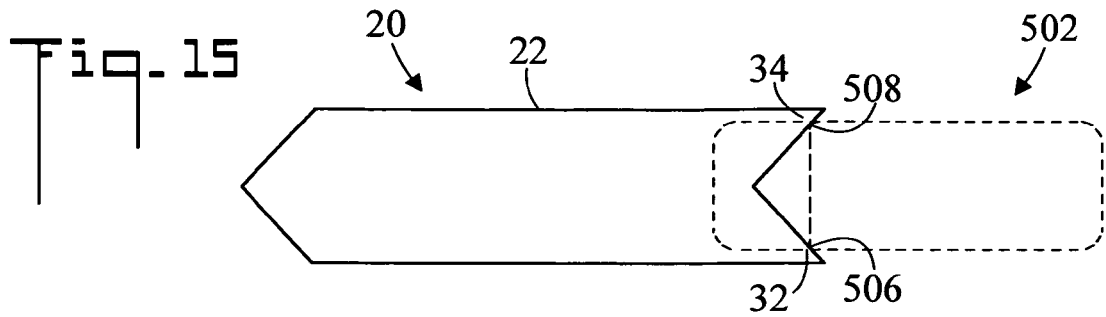
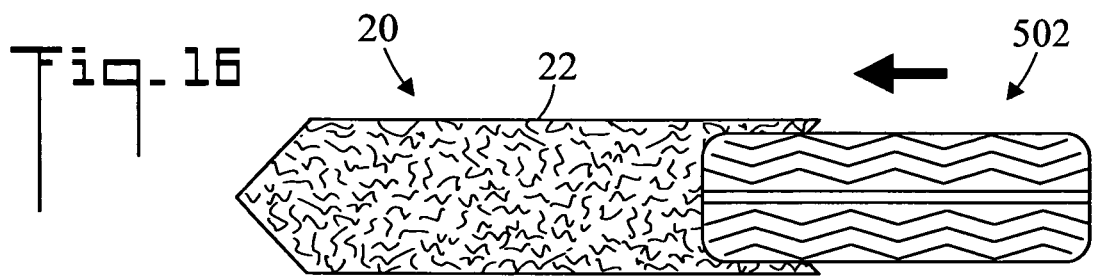
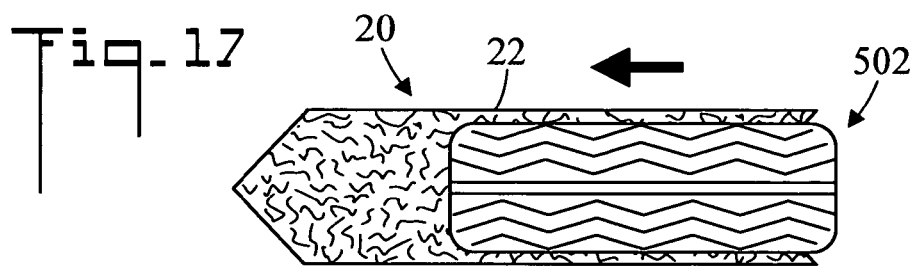
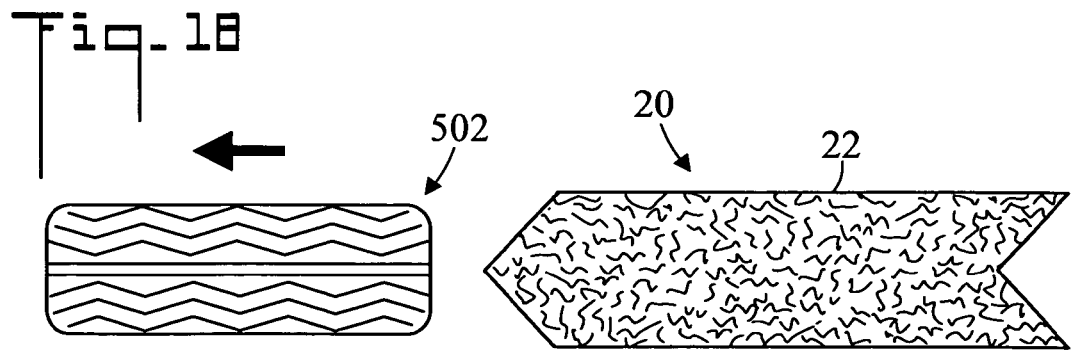

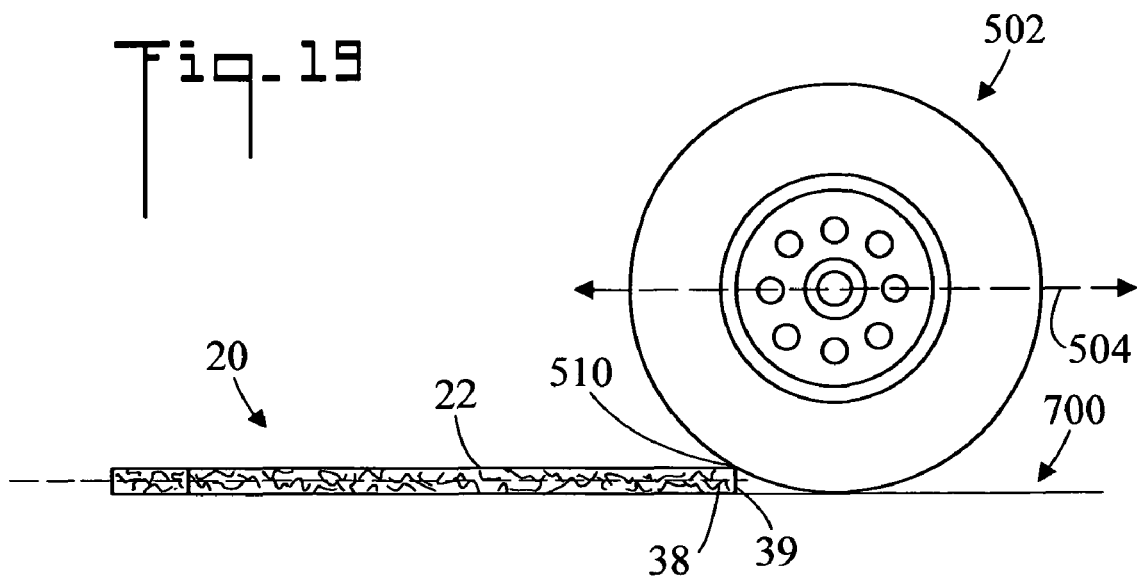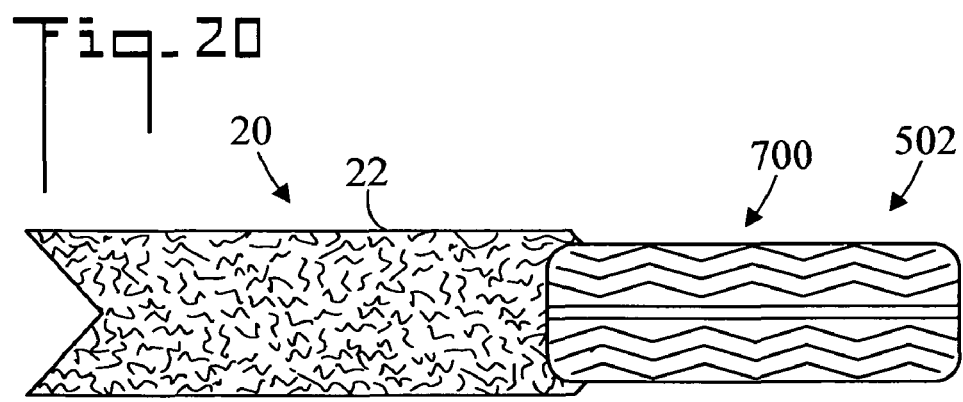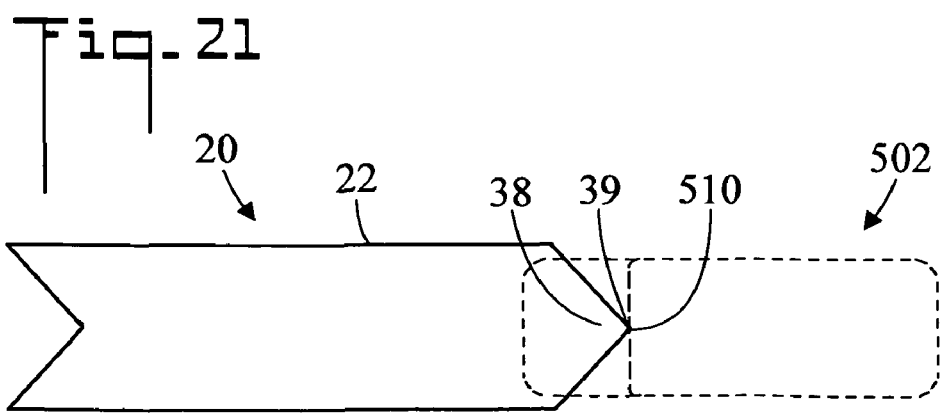

DEVICE FOR PROVIDING TRACTION FOR A TIRE AND METHOD OF USE

CROSS REFERENCE TO RELATED APPLICATION

This application is a Continuation-In-Part of and claims the filing benefit under 35 U.S.C. §120 of application Ser. No. 29/327,677, filed Nov. 11, 2008 now U.S. Pat. No. D,617,263, which is hereby incorporated by reference.

TECHNICAL FIELD

The present invention pertains generally to vehicles with tires which can become stuck in snow or ice, and more particularly to a pad which is placed on the snow or ice adjacent to the tire, so that the tire can be driven onto the pad.

BACKGROUND OF THE INVENTION

Snow and ice can cause vehicle tires to lose traction and resultantly spin or slide. In some instances the spinning or sliding makes it impossible for the vehicle to move. To correct this situation, a means is required to provide traction to the spinning or sliding tire(s). The present invention provides a solution to this problem.

BRIEF SUMMARY OF THE INVENTION

The present invention is directed to a device for providing traction for a tire which spins or slides on a surface of snow or ice. The device includes an elongated friction enhancing pad which has two functional ends. The pad is jammed between the tire and the snow or ice, and promotes tire traction by providing a non-slippery surface between the snow or ice and the spinning or slipping tire. The pad includes non-woven construction which allows the pad to secure itself in the snow or ice and provide a length of dry surface to slowly pull the vehicle ahead. The pad is lightweight, easy to use, and easily shaken of snow after use and stored in the trunk of a vehicle.

One end of the pad is concave and has two protruding arms or wings which engage and provide support and traction for the outer edges of the tire. The other end of the pad is convex and has a protrusion which is effective in engaging the center tread of the tire. In both cases, the design facilitates pad contact with the tire before movement, thereby enabling the tire to secure the pad prior to slow movement onto the pad.

The pad is constructed from coarse fibers to which an abrasive material has been added. The non-woven polyester and/or nylon construction is light and easy to handle, allows fast removal of excess snow, dries quickly after each use and provides for air circulation around the pad when stored in the vehicle. When snow melts, it doesn't create a slippery surface on pad like flat metal or rubber pads. Further, the non-woven open construction allows snow to penetrate the bottom of pad to facilitate stabilization.

In accordance with a preferred embodiment of the invention, a device for providing traction for a tire of a vehicle includes a pad which is fabricated from non-woven fibers which include an abrasive material. The pad promotes friction between the tire and the pad, and between the pad and a slippery support surface such as snow or ice.

In accordance with an aspect of the invention, the pad includes a first concave end which has two spaced apart arms, and an empty space between the arms. The arms are useful in engaging the outer edges of the tire.

In accordance with another aspect of the invention, the pad includes a second convex end which is useful in engaging the tread area of the tire.

Other aspects of the present invention will become apparent from the following detailed description, taken in conjunction with the accompanying drawings, which illustrate, by way of example, the principles of the invention.

BRIEF DESCRIPTION OF THE DRAWINGS

FIG. 1 is a reduced side elevation view of a prior art vehicle;

FIG. 2 is a side elevation view of a tire of the vehicle;

FIG. 3 is a top plan view of the tire;

FIG. 4 is a side elevation view of the tire disposed on a support surface which is a layer of snow, wherein the tire is partially disposed beneath a layer of snow:

FIG. 5 is a side elevation view of a tire disposed on a support surface which is a layer of ice;

FIG. 6 is a perspective view of a device for providing traction for a tire in accordance with a the present invention;

FIG. 7 is a top plan view of the device;

FIG. 8 is a side elevation view of the device:

FIG. 9 is front end view of the device;

FIG. 10 is a rear end view of the device;

FIG. 11 is an enlarged fragmented view of a non-woven fiber which includes an abrasive material;

FIG. 12 is a perspective view of the device placed in abutting relationship with a tire which is partially disposed beneath a layer of snow;

FIG. 13 is a side elevation view of the device, the tire, and the snow;

FIG. 14 is a top plan view of the device, the tire, and a layer of snow;

FIG. 15 is a simplified top plan view showing the abutting relationship of the device and the tire;

FIG. 16 is a top plan view of the tire moving onto the device;

FIG. 17 is a top plan view of the tire on the device;

FIG. 18 is a top plan view of the tire moved off of the device;

FIG. 19 is a side elevation view of the device placed in abutting relationship with a tire which is disposed on ice;

FIG. 20 is a top plan view of the device, the tire, and ice;

FIG. 21 is a simplified to plan view showing the abutting relationship of the device and the tire;

DETAILED DESCRIPTION OF THE INVENTION

Figure 22:
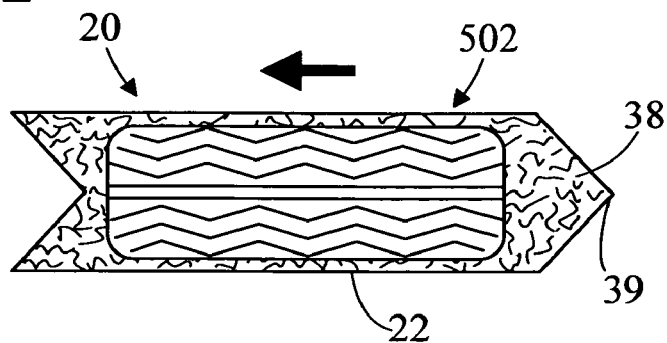
FIG. 22 is a top plan view of the tire moving onto the device.

Referring initially to FIG. 1, there is illustrated a reduce side elevation view of a prior art vehicle 500. As shown vehicle 500 is an automobile, but it could also be a truck, a van, a SUV, a motor home, a trailer, or any other similar vehicle. Vehicle 500 has a plurality of tires 502, one of which is shown in FIGS. 2 and 3. Tire 502 has an axis of motion 504 along which the tire moves in either a forward or reverse direction. Tire 502 also has a width WT, a first outer edge 506, an opposite second outer edge 508, and tread 510. It may be appreciated that first 506 and second 508 outer edges extend in a circle around tire 502, and are located at the junction of the tire tread 510 and tire side walls.

FIG. 4 is a side elevation view of tire 502 disposed on a support surface 600. As shown, support surface 600 includes a layer of snow, and tire 502 is partially disposed beneath the layer of snow. The ground or pavement 800 is covered by layer of snow 600. FIG. 5 is a side elevation view of tire 502 disposed on a support surface 700 which is a layer of ice. It may also be appreciated that the support surface could also include a layer of both snow and ice. In either case (snow or ice), tire 502 can have minimal traction and resultantly spin and/or slide when vehicle 500 is driven. Spinning will typically occur on the tires 502 which are connected to the vehicle drive train (i.e. rear tires for rear wheel drive vehicles, front tires for front wheel drive vehicles, or any tire for four-wheel drive vehicles).

Now referring to FIGS. 6-10, there are illustrated perspective, top plan, side elevation, front end, and rear end views respectively of a device for providing traction for a tire 502 of a vehicle 500 in accordance with a the present invention, the device generally designated as 20. Device 20 comprises a pad 22 which has a first end 24 and an opposite second end 26. Also referring to FIG. 11, pad 22 is fabricated from non-woven fibers 28 which include an abrasive material 30, so that when pad 22 is placed in abutting relationship with tire 502, abrasive material 30 promotes traction by enhancing friction between pad 22 and tire 502 (also refer to FIGS. 12-14). Abrasive material 30 provides strength and durability to pad 22, and can be bonded to or added to non-woven fibers 28. In one embodiment of the invention, pad 22 is constructed from multiple layers of coarse recycled polyester fibers 28 to which aluminum oxide grit and feldspar (or another abrasive additive) are bonded. The fibers 28 are coated at several stages of production with synthetic and natural latex bonding resin (or another bonding agent) and abrasive material 30. Additionally, the non-woven open construction allows snow, and to a lesser extent ice, to penetrate the bottom of pad 22 which holds pad 22 in place.

First end 24 is concave and includes a first outwardly projecting arm 32 spaced apart from a second outwardly projecting arm 34, wherein first 32 and second 34 outwardly projecting arms define an empty space 36 therebetween. In the shown embodiment, first 32 and second 34 outwardly projecting arms define a v-shaped empty space 36. Second end 26 is convex and includes a single outwardly projecting protuberance 38, which in the shown embodiment is v-shaped, and has a tip 39.

Also referring to FIGS. 3, and 12-14, pad 22 has a width W which is greater than the width WT of tire 502, so that first outwardly projecting arm 32 can be placed in abutting relationship with first outer edge 506 of tire 502, and second outwardly projecting arm 34 can be simultaneously placed in abutting relationship with second outer edge 508 of tire 502. Pad 22 also has a longitudinal axis 40.

In terms of dimensions, pad 22 can have (1) a width W of between about five inches and about 30 inches, with about 10.75 inches being found useful, (2) a thickness of between about 0.5 inches and about three inches, with about 0.875 inches being found useful, and (3) a length of between about 12 inches and about 200 inches, with about 34 inches being found useful and most suitable for a standard size personal use vehicle. Longer lengths can be used on larger vehicle such as trucks, and tractor/trailer combinations.

FIGS. 12-14 are perspective, side elevation, and top plan Views respectively of pad 22 placed in abutting relationship with tire 502 which is partially disposed beneath a layer of snow 600. Pad 22 is shaped and dimensioned so that either first end 24 or second end 26 (refer to FIGS. 19-23) can be positioned in abutting relationship with tire 502 with longitudinal axis 40 parallel to the axis of motion 504 of tire 502. In FIGS. 12-14 first end 24 of pad 22 has been positioned in abutting relationship with tire 502 and snow 600 so that first arm 32 abuts first outer edge 506 of tire 502, and second arm 34 abuts second outer edge 508 of tire 502. Empty space 36 of pad 22 receives tire 502. In this position, pad 22 provides traction to first 506 and second 508 outer edges of tire 502. It is noted that pad 22 has a width W which is greater than width WT of tire 502, so that first outwardly projecting arm 32 can be placed in abutting relationship with first outer edge 506 of tire 502, and second outwardly projecting arm 34 can be simultaneously placed in abutting relationship with second outer edge 508 of tire 502. It may also be appreciated that device 20 can be place behind tire 502 if it is more convenient to do so, and it is determined that reversing the vehicle and moving tire 502 backwards is the most effective method to move tire 502 onto pad 22.

FIG. 15 is a simplified top plan view showing the abutting relationship of device 20 and tire 502. First arm 32 abuts first outer edge 506 of tire 502, and second arm 34 abuts second outer edge 508 of tire 502.

FIGS. 16-18 show the sequence of providing traction. FIG. 16 is a top plan view of tire 502 moving onto the pad 22 of device 20. The friction enhancing abrasive material 30 on pad 22 increases the traction between tire 502 and pad 22, and allows tire 502 to roll onto pad 22. FIG. 17 is a top plan view of tire on device 20, and FIG. 18 is a top plan view of tire 502 moved off of device 20.

FIGS. 19-20 are side elevation and top plan views of device 20 placed in abutting relationship with tire 502 which is disposed on a support surface of ice 700. In this instance second end 38 of pad 22 is placed in abutting relationship with the treads 510 of tire 502. The tip 39 of second end 38 is jammed in between the tread 510 of tire 502 and the support surface of ice 700.

Figure 23:
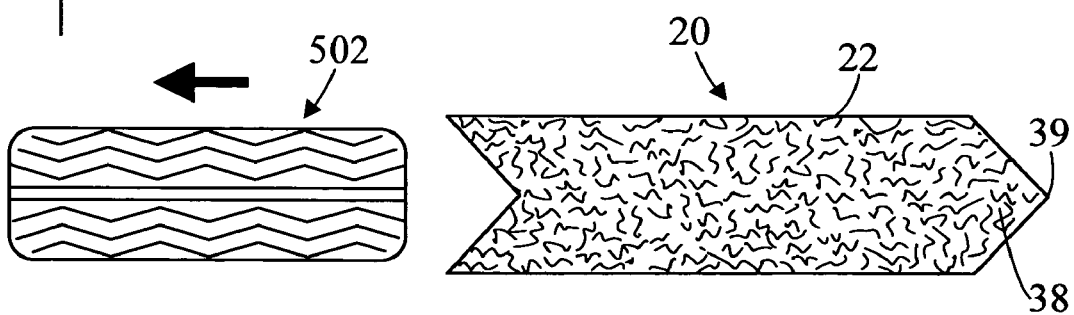
FIG. 23 is a top plan view of the tire moving off of the device.

FIG. 21 is a simplified to plan view showing the abutting relationship of device 20 and tire 502. Tip 39 of outwardly projecting protuberance 38 is placed in abutting relationship with ice 700 and tread 510 of tire 502. The friction enhancing abrasive material 30 on pad 22 increases the traction between tire 502 and pad 22, and allows tire 502 to roll onto pad 22 as is shown in FIG. 22. In FIG. 23, tire 502 has moved off of device 20.

Figure 24:
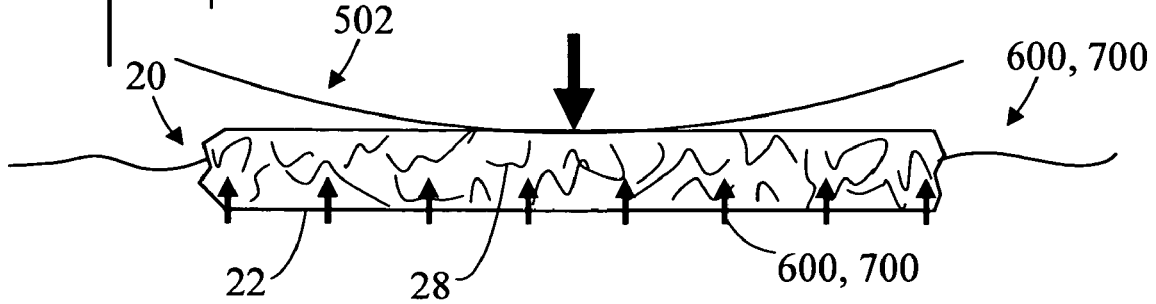
FIG. 24 is an enlarged side elevation view of the device, the tire, and snow or ice.

FIG. 24 is an enlarged fragmented side elevation view of device 20, tire 502 which reside on either snow 600 or ice 700. As tire 502 bears down upon pad 22, the non-woven fibers 28 allow the snow or ice of the support surface to penetrate pad 22 thereby stabilizing (holding in place) pad 22 on the support surface.

Figure 25:
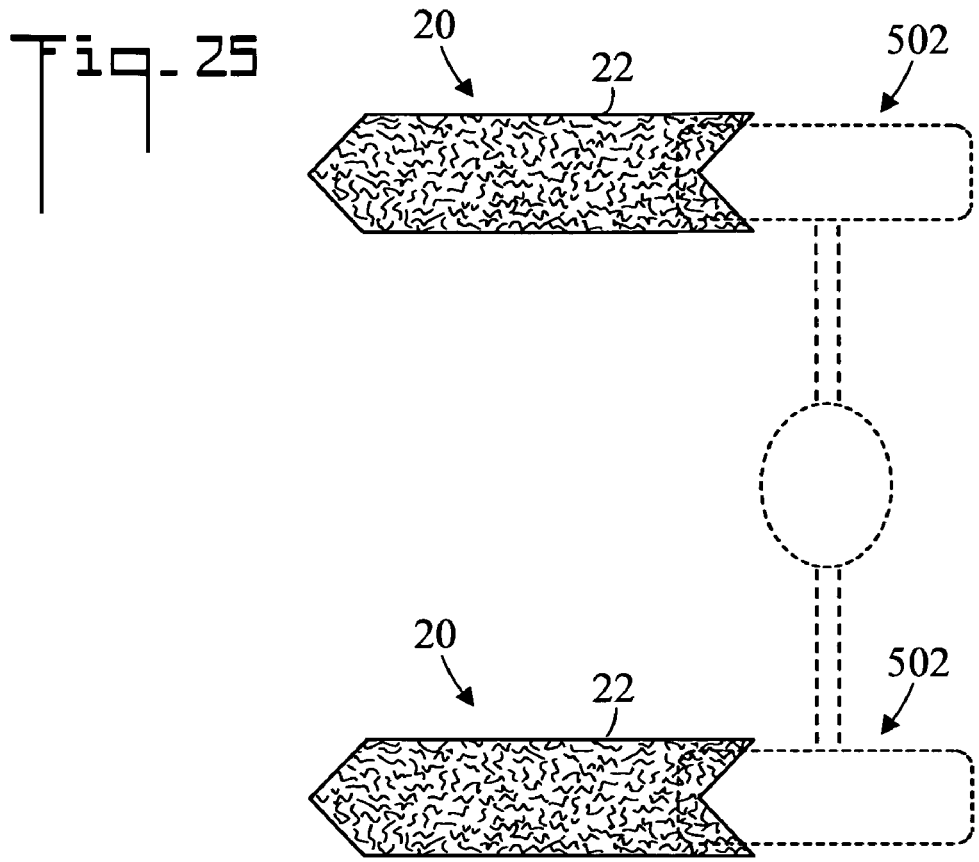
FIG. 25 is a top plan view of two devices placed in abutting relationship with two tires.

FIG. 25 is a top plan view of two devices 20 placed in abutting relationship with two tires 502. In this instance, devices 20 are placed adjacent to the two rear tires 502 of a rear wheel drive vehicle. Depending upon which tire or tires 502 of the vehicle are residing on snow or ice, one or more devices 20 will be required. In some cases one device 20 will suffice, where as in other cases four devices 20 might be necessary. For example if both of the left tires 502 are in snow or ice but the two right tires 502 are on dry pavement, then devices 20 can be placed adjacent to the two left tires 502 only. In most cases, no more than two devices 20 are required.

Figure 26:
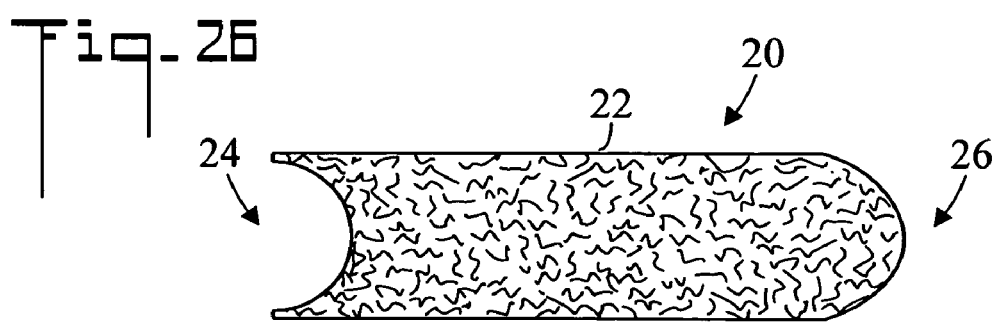
FIG. 26 is a top plan view of a second embodiment of the device.

FIG. 26 is a top plan view of a second embodiment of the device 20. In this embodiment, first end 24 has a semicircular empty space, and second end 26 is rounded.

Figure 27:
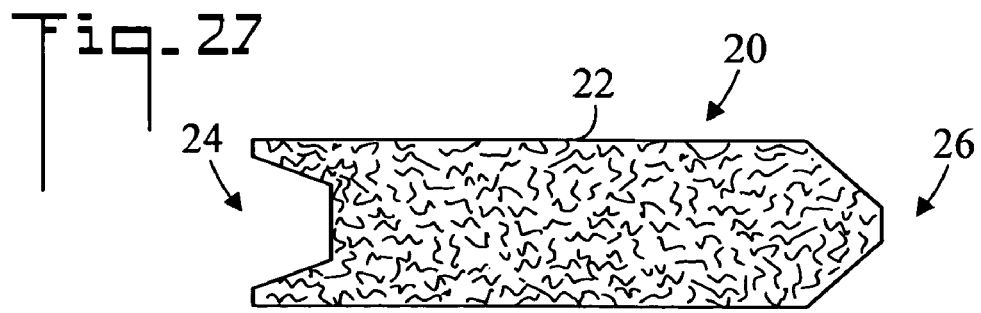
FIG. 27 is a top plan view of a third embodiment of the device.

FIG. 27 is a top plan view of a third embodiment of the device 20. In this embodiment, first end 24 is u-shaped, and second end 26 has a blunt end.

In terms of use, a method for providing traction for a tire 502 includes: (refer to FIGS. 1-27)

(a) providing a support surface which includes at least one of snow 600 and ice 700;

(b) providing a vehicle 500 having at least one tire 502, the tire 502 having an axis of motion 504, a width WT, a first outer edge 506, and an opposite second outer edge 508, the tire 502 disposed on the support surface;

(c) providing a device 20 for providing traction for tire 502 of vehicle 500, device 20 including:

a pad 22 having a first end 24 and an opposite second end 26;

pad 22 fabricated from non-woven fibers 28 which include an abrasive material 30;

(d) positioning one of first end 24 and second end 26 of pad 22 in abutting relationship with tire 502 and support surface 600 or 700, wherein abrasive material 30 enhances friction between pad 22 and tire 502;

(e) causing tire 502 to move onto pad 22; The movement of tire 502 onto pad is typically effected by driving vehicle 500 in the direction of pad 22, so that tire 502 rolls onto pad 22.

(f) causing tire 502 to move off of pad 22; and, (g) retrieving and storing pad 22.

The method further including:

in step (c), pad 22 having a longitudinal axis 40; and, in step (d), positioning pad 22 so that longitudinal axis 40 is parallel to axis of motion 504 of tire 502.

The method further including:

in step (c), first end 24 including a first outwardly projecting arm 32 spaced apart from a second outwardly projecting arm 34, first 32 and second 34 outwardly projecting arms defining an empty space 36 therebetween; and, in step (d) positioning pad 22 so that empty space 36 receives tire 502, and first arm 32 abuts first outer edge 506 of tire 502 and second arm 34 abuts second outer edge 508 of tire 502, thereby providing traction to first 506 and second 508 outer edges.

The method further including:

in step (c), first end 24 including a first outwardly projecting arm 32 spaced apart from a second outwardly projecting arm 34, first 32 and second 34 outwardly projecting arms defining an empty space 36 therebetween;

in step (c), pad 22 having a width W which is greater than width WT of tire 502, so that in step (d) first outwardly projecting arm 32 can be placed in abutting relationship with first outer edge 506 of tire 502, and second outwardly projecting arm 34 can be simultaneously placed in abutting relationship with second outer edge 508 of tire 502.

The method further including:

in step (a), the support surface including a layer of snow 600;

in step (b), tire 502 partially disposed beneath layer of snow 600; and, in step (c), first end 24 including a first outwardly projecting arm 32 spaced apart from a second outwardly projecting arm 34, said first 32 and second 34 outwardly projecting arms defining an empty space 36 therebetween;

in step (d), positioning first end 24 of pad 22 in abutting relationship with tire 502 and snow 600 so that first arm 32 abuts first outer edge 506 of tire 502, and second arm 34 abuts second outer edge 508 of tire 502.

The method further including:

in step (b), tire 502 substantially disposed on top of the support surface;

in step (c), second end 26 including an outwardly projecting protuberance 38; and, in step (d), positioning outwardly projecting protuberance 38 in abutting relationship with tire 502 and the support surface.

The method further including:

in step (e), non-woven fibers 28 allowing the snow or ice of the support surface to penetrate pad 22 thereby stabilizing pad 22 upon the support surface.

The method further including:

in step (b), vehicle 500 having a plurality of tires 502 disposed on the support surface; in step (c), providing a plurality of pads 22; and, in step (d), positioning pads 22 in abutting relationship with each of the plurality of tires 502.

The method further including:

after said retrieval of step (g), and before said storing of step (g), shaking any snow or ice off of pad 22.

The preferred embodiments of the invention described herein are exemplary and numerous modifications, variations, and rearrangements can be readily envisioned to achieve an equivalent result, all of which are intended to be embraced within the scope of the appended claims. Further, nothing in the above-provided discussions of the device and method should be construed as limiting the invention to a particular embodiment or combination of embodiments. The scope of the invention is best defined by the appended claims.

We claim:

1. A device for providing traction for a tire of a vehicle, the tire disposed upon a support surface and having an axis of motion, the device comprising:

an open non-woven pad having a first end and an opposite second end;

said pad fabricated from fibers which include an abrasive material which is bonded to said fibers;

when said pad is placed in abutting relationship with the tire and the support surface, said abrasive material enhancing friction between said pad and the tire and between said pad and the support surface;

said pad having uniformly flat top and bottom surfaces;

said pad having a longitudinal axis; and, said pad shaped and dimensioned so that either said first end or said second end can be positioned in abutting relationship with the tire and the support surface with said longitudinal axis parallel to the axis of motion of the tire.

2. A device for providing traction for a tire of a vehicle, the tire disposed upon a support surface, the device comprising:

an open non-woven pad having a first end and an opposite second end;

said pad fabricated from fibers which include an abrasive material which is bonded to said fibers;

when said pad is placed in abutting relationship with the tire and the support surface, said abrasive material enhancing friction between said pad and the tire and between said pad and the support surface; and said open non-woven pad allowing the support surface to penetrate said pad thereby holding said pad in place upon the support surface.

3. A device for providing traction for a tire of a vehicle, the tire disposed upon a support surface, the tire having a width, a first outer edge, and an opposite second outer edge, the device comprising:

an open non-woven pad having a first end and an opposite second end;

said pad fabricated from fibers which include an abrasive material which is bonded to said fibers;

when said pad is placed in abutting relationship with the tire and the support surface, said abrasive material enhancing friction between said pad and the tire and between said pad and the support surface;

said first end including a first outwardly projecting arm spaced apart from a second outwardly projecting arm, said first and second outwardly projecting arms defining an empty space therebetween; and, said pad having a width which is greater than the width of the tire, so that said first outwardly projecting arm can be placed in abutting relationship with the first outer edge of the tire, and said second outwardly projecting arm can be simultaneously placed in abutting relationship with the second outer edge of the tire.

4. A device for providing traction for a tire of a vehicle, the tire disposed upon a support surface, the device comprising:

an open non-woven pad having a first end and an opposite second end;

said pad fabricated from fibers which include an abrasive material which is bonded to said fibers;

when said pad is placed in abutting relationship with the tire and the support surface, said abrasive material enhancing friction between said pad and the tire and between said pad and the support surface; and, said abrasive material being bonded to said fibers with a bonding agent, wherein said fibers are coated with said bonding agent and said abrasive material.

5. A device for providing traction for a tire of a vehicle, the tire disposed upon a support surface, the tire having an axis of motion, a width, a first outer edge, and an opposite second outer edge, the device comprising:

an open non-woven pad having a first end and an opposite second end;

said pad fabricated from fibers which include an abrasive material which is bonded to said fibers;

when said pad is placed in abutting relationship with the tire and the support surface, said abrasive material enhancing friction between said pad and the tire and between said pad and the support surface;

said pad having uniformly flat top and bottom surfaces;

said pad having a longitudinal axis;

said open non-woven pad allowing the support surface to penetrate said pad thereby holding said pad in place upon the support surface;

said pad shaped and dimensioned so that either said first end or said second end can be positioned in abutting relationship with the tire with said longitudinal axis parallel to the axis of motion of the tire;

said first end including a first outwardly projecting arm spaced apart from a second outwardly projecting arm, said first and second outwardly projecting arms defining an empty space therebetween;

said pad having a width which is greater than the width of the tire, so that said first outwardly projecting arm can be placed in abutting relationship with the first outer edge of the tire, and said second outwardly projecting arm can be simultaneously placed in abutting relationship with the second outer edge of the tire; and, said abrasive material being bonded to said fibers with a bonding agent, wherein said fibers are coated with said bonding agent and said abrasive material.

6. A method for providing traction for a tire which spins or slides on a slippery support surface, comprising:

(a) providing a vehicle having at least one tire, said tire having an axis of motion, a width, a first outer edge, and an opposite second outer edge, said tire disposed on the support surface;

(b) providing a device for providing traction for said tire of said vehicle, said device including:

an open non-woven pad having a first end and an opposite second end;

said pad fabricated from fibers which include an abrasive material which is bonded to said fibers;

said pad having uniformly flat top and bottom surfaces;

said pad having a longitudinal axis;

said pad shaped and dimensioned so that either said first end or said second end can be positioned in abutting relationship with the tire with said longitudinal axis parallel to the axis of motion of the tire;

(c) positioning one of said first end and said second end of said pad in abutting relationship with said tire and the support surface so that said longitudinal axis is parallel to said axis of motion of said tire, wherein said abrasive material enhances friction between said pad and said tire and between said pad and the support surface and causes said pad to secure itself to the support surface;

(d) causing said tire to move onto said pad;

(e) causing said tire to move off of said pad; and, (f) retrieving and storing said pad.

7. A method for providing traction for a tire which spins or slides on a slippery support surface, comprising:

(a) providing a vehicle having at least one tire, said tire having an axis of motion, a width, a first outer edge, and an opposite second outer edge, said tire disposed on the support surface;

(b) providing a device for providing traction for said tire of said vehicle, said device including:

an open non-woven pad having a first end and an opposite second end;

said pad fabricated from fibers which include an abrasive material which is bonded to said fibers;

(c) positioning one of said first end and said second end of said pad in abutting relationship with said tire and the support surface, wherein said abrasive material enhances friction between said pad and said tire and between said pad and the support surface and causes said pad to secure itself to the support surface, said open non-woven pad allowing the support surface to penetrate said pad thereby holding said pad in place upon the support surface;

(d) causing said tire to move onto said pad;

(e) causing said tire to move off of said pad; and, (f) retrieving and storing said pad.

8. A method for providing traction for a tire which spins or slides on a slippery support surface, comprising:

(a) providing a vehicle having at least one tire, said tire having an axis of motion, a width, a first outer edge, and an opposite second outer edge, said tire disposed on the support surface;

(b) providing a device for providing traction for said tire of said vehicle, said device including:

an open non-woven pad having a first end and an opposite second end;

said pad fabricated from fibers which include an abrasive material which is bonded to said fibers;

said first end including a first outwardly projecting arm spaced apart from a second outwardly projecting arm, said first and second outwardly projecting arms defining an empty space therebetween;

said pad having a width which is greater than said width of said tire, wherein said first outwardly projecting arm can be placed in abutting relationship with said first outer edge of said tire, and said second outwardly projecting arm can be simultaneously placed in abutting relationship with said second outer edge of said tire;

(c) positioning one of said first end and said second end of said pad in abutting relationship with said tire and the support surface, wherein said abrasive material enhances friction between said pad and said tire and between said pad and the support surface and causes said pad to secure itself to the support surface, (d) causing said tire to move onto said pad;

(e) causing said tire to move off of said pad; and, (f) retrieving and storing said pad.

9. A method for providing traction for a tire which spins or slides on a support surface of a layer of snow, comprising:

(a) providing a vehicle having at least one tire, said tire having an axis of motion, a width, a first outer edge, and an opposite second outer edge, said tire partially disposed beneath the layer of snow;

(b) providing a device for providing traction for said tire of said vehicle, said device including:

an open non-woven pad having a first end and an opposite second end;

said pad fabricated from fibers which include an abrasive material which is bonded to said fibers;

said first end including a first outwardly projecting arm spaced apart from a second outwardly projecting arm, said first and second outwardly projecting arms defining an empty space therebetween;

(c) positioning said first end of said pad in abutting relationship with said tire and the snow so that said first arm abuts said first outer edge of said tire, and said second arm abuts said second outer edge of said tire, wherein said abrasive material enhances friction between said pad and said tire and between said pad and the snow and causes said pad to secure itself to the snow;

(d) causing said tire to move onto said pad;

(e) causing said tire to move off of said pad; and, (f) retrieving and storing said pad.

10. A method for providing traction for a tire which spins or slides on a slippery support surface, comprising:

(a) providing a vehicle having at least one tire, said tire having an axis of motion, a width, a first outer edge, and an opposite second outer edge, said tire disposed on the support surface;

(b) providing a device for providing traction for said tire of said vehicle, said device including:

an open non-woven pad having a first end and an opposite second end;

said pad fabricated from fibers which include an abrasive material which is bonded to said fibers;

said abrasive material being bonded to said fibers with a bonding agent, wherein said fibers are coated with said bonding agent and said abrasive material.

(c) positioning one of said first end and said second end of said pad in abutting relationship with said tire and the support surface, wherein said abrasive material enhances friction between said pad and said tire and between said pad and the support surface and causes said pad to secure itself to the support surface;

(d) causing said tire to move onto said pad;

(e) causing said tire to move off of said pad; and, (f) retrieving and storing said pad.

* * * * *